(12) United States Patent
Wang et al.

(10) Patent No.: US 11,300,869 B2
(45) Date of Patent: Apr. 12, 2022

(54) SCREEN AND PROJECTION SYSTEM

(71) Applicant: Appotronics Corporation Limited, Shenzhen (CN)

(72) Inventors: Lin Wang, Shenzhen (CN); Yi Li, Shenzhen (CN)

(73) Assignee: Appotronics Corporation Limited, Shenzhen (CN)

( * ) Notice: Subject to any disclaimer, the term of this patent is extended or adjusted under 35 U.S.C. 154(b) by 0 days.

(21) Appl. No.: 16/979,264

(22) PCT Filed: Oct. 16, 2018

(86) PCT No.: PCT/CN2018/110333
§ 371 (c)(1),
(2) Date: Sep. 9, 2020

(87) PCT Pub. No.: WO2019/169870
PCT Pub. Date: Sep. 12, 2019

(65) Prior Publication Data
US 2020/0401034 A1    Dec. 24, 2020

(30) Foreign Application Priority Data
Mar. 9, 2018  (CN) .......................... 201810194779.3

(51) Int. Cl.
*G03B 21/60* (2014.01)
*G03B 21/28* (2006.01)
*G02B 5/00* (2006.01)
*G02B 5/02* (2006.01)

(52) U.S. Cl.
CPC ............. *G03B 21/60* (2013.01); *G02B 5/003* (2013.01); *G02B 5/0273* (2013.01); *G03B 21/28* (2013.01)

(58) Field of Classification Search
CPC .. G03B 21/1428; G03B 21/60; G03B 21/567; G03B 21/62; G03B 21/625; G02B 5/003; G02B 5/0273
USPC ......................................... 359/443, 449, 452
See application file for complete search history.

(56) References Cited

U.S. PATENT DOCUMENTS 6,185,038 B1    2/2001  Yamaguchi et al.
2021/0026231 A1*  1/2021  Wang ..................... G02B 5/003

FOREIGN PATENT DOCUMENTS

CN            1130597 C    12/2003

* cited by examiner

*Primary Examiner* — William C. Dowling
(74) *Attorney, Agent, or Firm* — ScienBiziP, P.C.

(57) ABSTRACT

A screen capable of reflecting projected light from a projector to a viewer's field of view, at least comprising a surface diffusion layer (14), a transmission light-absorbing layer (13) and a projection reflective layer (12) which are stacked sequentially from the incident side of the projected light. The projection reflective layer (12) selectively reflects the projected light. The transmission light-absorbing layer (13) comprises light-absorbing material particles, and the distribution of the light-absorbing material particles in the transmission light-absorbing layer (13) is set according to the distribution of the Fresnel loss of the projected light on the surface of the screen, such that the light transmittance of the transmission light-absorbing layer (13) is higher in the region where the Fresnel loss is larger. Further disclosed is a projection system comprising the screen. The screen and the projection system have high contrast and high brightness uniformity.

18 Claims, 9 Drawing Sheets

SCREEN AND PROJECTION SYSTEM

TECHNICAL FIELD

The present disclosure relates to a field of screen. Specifically, this disclosure relates to a projection screen and a projection system having a high contrast and a high uniformity of brightness.

BACKGROUND

In recent years, the ultra short throw projector attracts more and more attention. The ultra short throw projector has a very low throw ratio, and its emergence means that a minimum distance between the projector and the projection screen is greatly shortened, so that the case that pictures are blocked due to movement of people or objects during the image projection may not occur. In addition, the projection system using the ultra short throw projector is small in size, easy to install, has a low cost, and can easily achieve a picture larger than 100 inches within a short projection distance.

In such a projection system, in addition to the projector, the projection screen is an important factor affecting the quality of the projection image. In the projection display of the projection screen, image contrast and brightness uniformity are two important parameters to evaluate the screen picture quality. Usually, the contrast of projector can reach thousands to one. However, in a living room and other actual home use environment, the ambient light may have a strong impact on the screen contrast. A conventional projection screen can reflect not only the projection light of the projector, but also the ambient light, which seriously reduces the contrast and greatly affects the viewing experience. In addition, due to a low throw ratio of the ultra short throw projector, incidence angles of the projection light are quite different at different positions of the projection screen. A Fresnel reflection of the screen surface is positively correlated with the incident angle of the projection light; the greater the incident angle, the higher the Fresnel reflection. Most of light of Fresnel reflection on the screen surface cannot enter the audience's viewing field. Therefore, due to the uneven Fresnel reflection on the screen surface, the brightness difference between a center area and an edge area of the screen surface can be as high as 20%.

In order to improve the brightness uniformity of the screen, the patent document CN104516182B proposes a technical solution of adding a polarizer array having gradual absorptivity to the optical system of the projector, so as to form a projection distribution with a dark middle and a bright edge to compensate for the brightness nonuniformity of the projection screen. In addition, the patent document CN1723699A provides a method of compensating the brightness nonuniformity by using two projectors. However, the above two methods do not involve improvements of the screen itself, but compensate the brightness uniformity by changing the design of the projector.

Therefore, a screen capable of improving the brightness uniformity of the projection screen is needed.

SUMMARY

In view of the above problems, the present disclosure intends to provide a screen having high brightness uniformity and a projection system with such a screen.

According to a first embodiment of the present disclosure, a screen is provided. The screen is capable of reflecting projection light from a projector to viewing field of a viewer. The screen at least includes a surface diffusion layer, a transmitting and light-absorbing layer, and a projection-reflecting layer stacked sequentially from an incident side of the projection light. The projection-reflecting layer is configured to selectively reflect the projection light; and the transmitting and projection-reflecting layer includes light absorbing material particles. Distribution of the light absorbing material particles in the transmission light absorbing layer is set according to distribution of Fresnel loss of the projection light on a surface of the screen, so that the greater a Fresnel loss in a region of the screen, the higher a transmittance of the transmission light-absorbing layer.

In one embodiment, the transmitting and projection-reflecting layer may include a light-absorbing medium layer and a transparent medium layer; the light-absorbing medium layer comprises light absorbing material particles distributed with a uniform density; a thickness of the light absorbing medium layer in a region is inversely proportional to a Fresnel reflectance of the screen surface in the region for the projection light; a total thickness of the light-absorbing medium layer and the transparent medium layer is a fixed value; and an absolute value of a difference between refractive indexes of the light-absorbing medium layer and the transparent medium layer is not greater than 0.2.

In one embodiment, in a horizontal direction, the thickness of the light-absorbing medium layer gradually decreases from a center to both edges of the screen, and/or in a vertical direction, the thickness of the light-absorbing medium layer gradually decreases from a bottom to a top of the screen.

In one embodiment, a variation of the thickness of the light-absorbing medium layer in a horizontal direction conforms to a linear distribution or a curvilinear distribution, or a variation of the thickness of the light-absorbing medium layer in a vertical direction conforms to a linear distribution or a curvilinear distribution.

In one embodiment, the light-absorbing medium layer comprises light-absorbing dye, and a maximum thickness difference between different areas of the light-absorbing medium layer decreases with increasing of a proportion of the light-absorbing dye.

In one embodiment, the transparent medium layer is a transparent glue layer.

In some embodiments, the projection-reflecting layer may include a total reflection layer and a light absorbing layer stacked sequentially from the incident side of the projection light; the light absorbing layer is capable of absorbing light; the total reflection layer comprises a microstructure layer, the microstructure layer comprises a plurality of micro-lens units; the microstructure unit comprises a first plane at a lower side and a second plane at an upper side, and the first plane intersects the second plane, the plurality of microstructure units form a serrated structure, and total internal reflection of the projection light continuously happens on the first plane and the second plane. In one embodiment, the microstructure layer comprises a rotationally symmetric structure, and a rotation center axis is perpendicular to a plane of the screen and is located under the screen.

Alternatively, in some embodiments, the projection-reflecting layer is a Fresnel reflection layer.

According to a second embodiment of the present disclosure, a projection system is provided. The projection system includes a projector and the above screen.

In the present disclosure, the transmitting and projection-reflecting layer is arranged between the total reflection layer and the surface diffusion layer of the screen. The transmitting and projection-reflecting layer includes light absorbing material particles; the distribution of the light absorbing material particles in the transmission light absorbing layer is set according to distribution of the Fresnel loss of the projection light on the surface of the screen. In addition, it is preferred that the screen is provided with a total reflection layer capable of continuously generating twice total internal reflections of the projection light and being able to pass through at least part of the ambient light. Therefore, the screen and projection system according to the present disclosure can have a high contrast and high brightness uniformity.

It should be understood that the beneficial effects of the present disclosure are not limited to the above effects, but may be any of the beneficial effects described herein.

DETAILED DESCRIPTION

Figure 1:
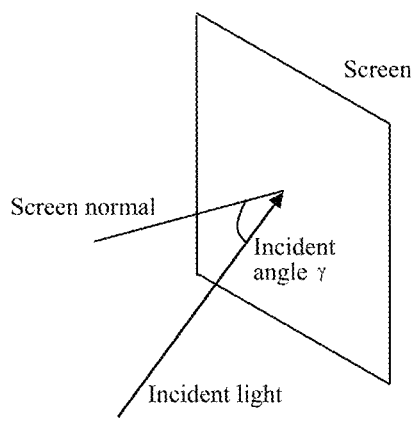
FIG. 1 shows examples of incident angles and Fresnel reflectivity of the projected light of an ultra short throw projector at different positions of the screen.
Figure 1:
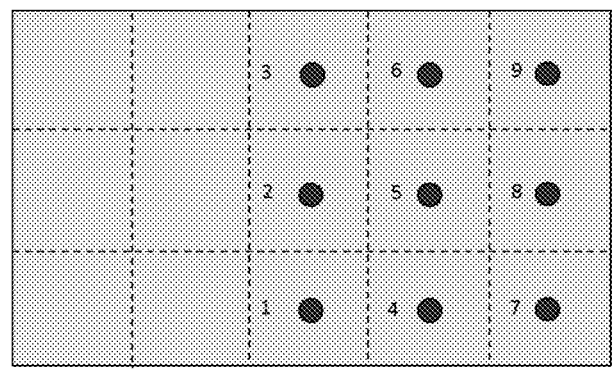
Figure 1:

Next, various specific embodiments according to the present disclosure will be described in detail with reference to the accompanying drawings. It should be emphasized that all dimensions in the drawings are only schematic and not necessarily in accordance with the true scale, so they are not limited. For example, it should be understood that the thickness, shape, size, etc. of each layer in the multi-layer structure of the projection screen illustrated are not shown according to the actual size and proportion, but only for the convenience of illustration.

1. Overview of the Screen According to the Disclosure

Generally, the screen used in the projection field generally includes a two-layers stacked structure of a surface diffusion layer and a projection-reflecting layer. The surface diffusion layer is located on an incident side of the projection light. The projection light after passing through the surface diffusion layer enters the projection-reflecting layer, and the projection-reflecting layer selectively reflects the incident light. The projection light reflected by the projection-reflecting layer passes through the surface diffusion layer again, and then exits from the screen and enters the viewer's viewing field. In the following, the incident side of the projection light is also referred to as an outside side of the screen (i.e., a side facing the viewer), and the light absorbing layer side is referred to as an inside side of the screen (i.e., a side facing away from the viewer).

However, when light is incident from air to a surface of a medium at a certain angle, Fresnel reflection occurs. The incidence angles of the projection light from the projector, especially the ultra short throw projector, varies greatly at different positions of the projection screen. FIG. 1 shows a variation and correlation of incident angles of incident light and Fresnel reflection of screen surface at different positions of the screen. When the incident light as shown in a of FIG. 1 is incident to nine different positions on the screen shown in b of FIG. 1, the incident angles of the incident light at different positions and the Fresnel reflectivity at the different positions are shown in c of FIG. 1. It can be seen from c of FIG. 1 that the less the incident angle, the lower the Fresnel reflectivity.

Specifically, when light is incident from air to the surface of the medium at a certain angle, Fresnel reflection occurs. Specifically, the reflectivity of horizontally polarized light is $R_{//}$ and the reflectivity of vertically polarized light is $R_{\perp}$:

$$R_{//} = \left[\frac{\tan(\theta_i - \theta_t)}{\tan(\theta_i + \theta_t)}\right]^2 \quad R_{\perp} = \left[\frac{\sin(\theta_i - \theta_t)}{\sin(\theta_i + \theta_t)}\right]^2 \quad (1)$$

Wherein $\theta_i$ is the incident angle the incident light 31 and $\theta_t$ is the refraction angle of the incident light 31.

Figure 2:
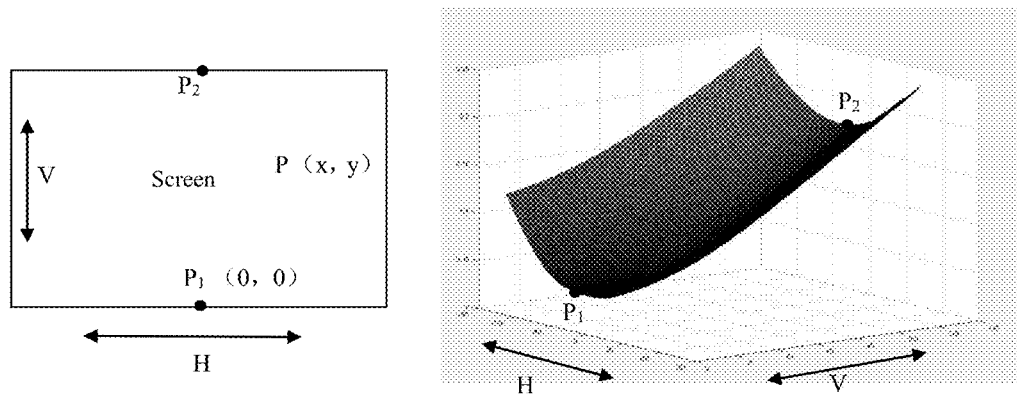
FIG. 2 shows a distribution of Fresnel reflectivity by calculating at various positions of the screen.

For the projection light without a fixed polarization state, the reflectivity of the surface is an average of a horizontal reflectivity and a vertical reflectivity. According to a relative position between the projector and the screen, the incident angle from the projector to the screen surface can be calculated. According to the above formula (1), the Fresnel reflectivity f(x, y) at each point of the screen can be calculated theoretically, wherein (x, y) is a position coordinate of the screen surface. FIG. 2 shows the calculated Fresnel reflectivity distribution view of the projection light of the ultra short throw projector on the screen, wherein H represents the horizontal coordinate of the screen and V represents the vertical coordinate of the screen. As can be seen from FIG. 2, the Fresnel reflectivity of the screen presents a three-dimensional distribution function. In the horizontal direction, the Fresnel reflectivity distribution is low in the middle and high on both edges, and is symmetrical relative to the screen axis P1P2. In the vertical direction, the Fresnel reflectivity distribution increases gradually from bottom to top. In general, the closer the screen is to the projector, the less the incident angle is, the lower the Fresnel reflectivity, and the lower the Fresnel loss. The lower the Fresnel loss, the brighter the screen.

Therefore, in order to compensate for the influence of surface Fresnel loss on the brightness uniformity of the screen, according to the present disclosure, a transmitting and projection-reflecting layer is also arranged between the surface diffusion layer and the projection-reflecting layer. The transmitting and projection-reflecting layer is made of transparent organic polymer material doped with light absorbing material particles, such as carbon black, carbon nanoparticles, etc. According to the planar distribution of the Fresnel loss of the projection light on the screen surface, the doping distribution of the light absorbing material in the transmitting and projection-reflecting layer is designed accordingly, so that the greater the Fresnel loss in a certain region of the screen, the higher the transmittance of a portion of the transmitting and projection-reflecting layer in the certain region. In other words, the transmittance distribution of the light absorbing layer on the screen plane is positively correlated with the Fresnel loss distribution on the screen surface. By setting such a transmitting and light-absorbing layer, a small portion of the light incident at different positions of the screen plane is absorbed in different degrees when passing through the transmitting and light-absorbing layer, so as to realize the compensation of the uneven Fresnel loss distribution on the screen surface, so as to realize the screen display image having a uniform brightness and improve the brightness uniformity of the screen.

2. Specific embodiment of multi-layer structure of screen

Figure 3:
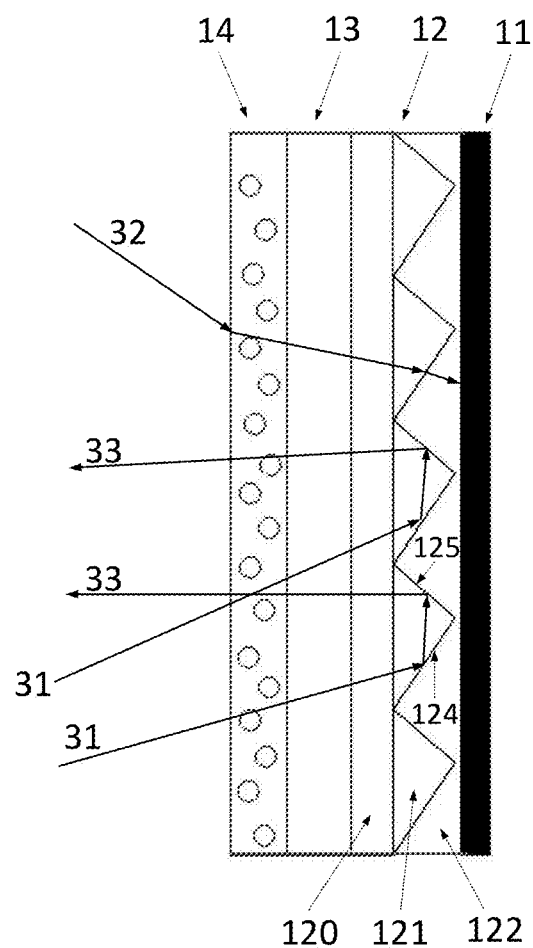
FIG. 3 is a side view showing a schematic structure of a screen according to an embodiment of the present disclosure.

FIG. 3 shows the structure of a screen according to an embodiment of the present disclosure. As shown in FIG. 3, the screen according to the disclosure comprises a light absorbing layer 11, a total reflection layer 12, a transmitting and projection-reflecting layer 13, and a surface diffusion layer 14 stacked in sequence.

FIG. 3 a cross-sectional view showing a laminated structure of a screen according to an embodiment of the present disclosure. The light absorbing layer 11 is a black light absorbing layer which can fully absorb the light incident on it. As shown in FIG. 3, the total reflection layer 12 includes a transparent substrate layer 120, a microstructure layer 121, and an inner layer 122 stacked sequentially from an incident side of the projection light. The transparent substrate layer 120 may be made of a transparent material such as PET, PC, or PMMA. The microstructure layer 121 is arranged on the inner side of the transparent substrate layer 120 (i.e., a side opposite to the incident side of the projection light). The inner layer 122 is formed on a side of the microstructure layer 121 in contact with the light absorbing layer 11, and contacts the light absorbing layer 11. The refractive index of the material of the inner layer 122 is lower than that of the material of the microstructure layer 121.

The microstructure layer 121 is provided with a plurality of microstructure units. Each microstructure unit can be formed as a total reflection prism. The microstructural element shown in FIG. 3 has a triangular cross-section structure. In addition, the microstructural unit may also have a cross-sectional structure of other shapes, such as a trapezoid. Each microstructure unit comprises two inclined planes 124 and 125 intersecting with each other, wherein the inclined plane 124 at the lower side corresponds to the first plane in the disclosure, and the inclined plane 125 at the upper side corresponds to the second plane in the disclosure. The tilt angles of the two inclined planes are specially designed (to be explained in detail later), so that at least most of the projection light 31 incident from the lower part of the screen can be totally reflected twice consecutively at the two inclined planes, and finally become an emergent light 33 reflected to the viewer's viewing field, while most of the ambient stray light 32 from the top of the screen is absorbed by the light absorbing layer 11 through the total reflection layer 12 because the angle cannot meet the total internal reflection condition in the total reflection layer. The two intersecting planes 124 and 125 of the microstructure unit can also be regarded as interface between the microstructure layer 121 and the inner layer 122, in which the microstructure layer 121 is the first material layer and the inner layer 122 is the second material layer. In the cross section in FIG. 3, the microstructure units of the microstructure layer 121 are arranged periodically to form a serrated structure; thus, the inner layer 122 also has a corresponding serrated structure. However, it should be understood that the microstructure units can also be arranged non-periodically, as long as serrated structures can be formed in the cross section shown in FIG. 3.

For example, a microstructure layer 121 having a microstructure array can be formed by coating resin on the inner side of the transparent substrate layer 120 using a pair rolls and curing by ultraviolet. The microstructure layer 121 adopts resin material, and the resin generally is epoxy resin adhesive, acrylate adhesive, polyester adhesive, polyurethane adhesive, or polyimide adhesive, etc. In one embodiment, the transparent substrate layer 120 and the microstructure layer 121 are formed from one single substrate. For example, PET is used as the material of transparent substrate layer 120, and the microstructure array of prisms is formed by coating resin on the inner side of PET substrate using a pair rolls and curing by ultraviolet. Of course, the transparent substrate layer 120 and the microstructure layer 121 may also be made of different materials. The inner layer 122 may be, for example, an air layer, a quartz layer, or a glass layer, etc.

As shown in FIG. 3, the transmitting and projection-reflecting layer 13 is arranged outside the total reflection layer 12. The transmitting and projection-reflecting layer 13 is made of transparent organic polymer material and doped with the light absorbing material particles, such as carbon black, carbon nanoparticles, etc. According to the plane distribution of the Fresnel loss of the projection light 31 on the screen surface, the doping distribution of the light absorbing material in the transmitting and projection-reflecting layer 13 is controlled, so that the greater the Fresnel loss of a certain region of the screen, the higher the transmittance of the part of the transmitting and projection-reflecting layer 13 in the certain region. In other words, the transmittance distribution of the light absorbing layer 13 on the screen plane is positively correlated with the Fresnel loss distribution on the screen surface. By setting such a transmitting and light-absorbing layer, a small portion of the light incident at different positions of the screen plane is absorbed in different degrees when passing through the transmitting and light-absorbing layer, so as to realize the compensation of the uneven Fresnel loss distribution on the screen surface, so as to realize the screen display image having a uniform brightness and improve the brightness uniformity of the screen.

The surface diffusion layer 14 is arranged at the outermost side of the screen. After totally reflected by the total reflection layer, the divergence angle of the emitting light is generally very small. The surface diffusion layer 14 can increase the divergence angle of the emitting light and increase a visual range of the projection picture. In the example shown in FIG. 3, only one surface diffusion layer 14 is provided outside the transmitting and projection-reflecting layer 13. However, a plurality of surface diffusion layers may also be provided. For example, the surface diffusion layers can be formed by stacking a plurality of commercial optical scattering films.

As shown in FIG. 3, the projection light 31 from the projector below the screen enters the transmitting and projection-reflecting layer 13 by the surface diffusion layer 14. In the transmitting and projection-reflecting layer 13, the projection light 31 incident in different regions of the screen is absorbed in different degrees and then incident to the total reflection layer 12. The projection light 31 has two successive total internal reflections on the inclined planes 124 and 125 in the total reflection layer 12, and then passes through the transmitting and projection-reflecting layer 13 and the surface diffusion layer 14, and finally emits to the viewer's viewing field and becomes emergent light 33 of the screen. The ambient stray light 32 mainly comes from the dome lamp in the room. In most cases, the dome lamp is far away from a rotation axis of a rotational symmetry structure of the microstructure unit of the screen, and the incident angles of ambient stray light 32 are much less than that of projection light. Therefore, the ambient stray light 32 cannot meet the condition of total internal reflection at interface 124 and 125, and most of the ambient stray light 32 passes through the microstructure unit and is absorbed by the light absorbing layer 11.

Figure 4:
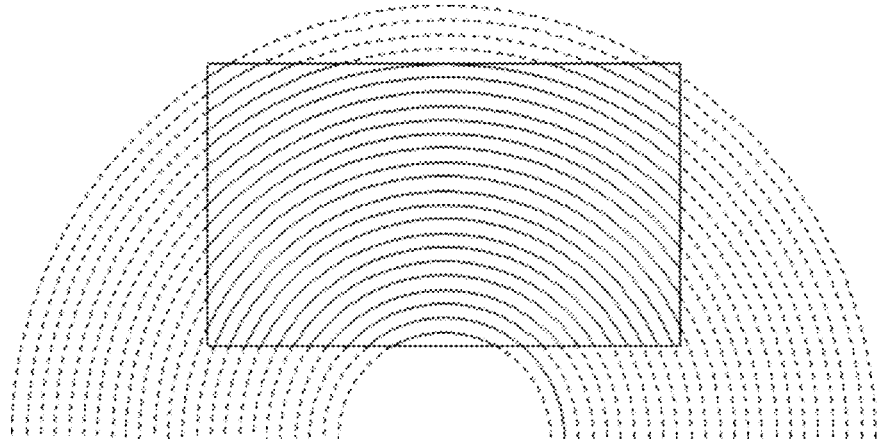
FIG. 4 is a schematic view showing a rotationally symmetric structure of a microstructure unit of a total reflection layer of the screen according to an embodiment of the present disclosure.

In the total reflection layer 12, as shown in FIG. 4, the microstructure units of the microstructure layer 121 have a rotationally symmetric array arrangement structure on the screen plane. The axis of the rotation center (optical center) of the rotationally symmetric array arrangement structure is perpendicular to the screen plane and located below the screen. In one embodiment, the projector 20 (see FIG. 5) is arranged on the axis of the rotation center. Therefore, in each microstructure unit of the microstructure layer 121, the microstructure layer 121 is a row of rotationally symmetric prisms formed on the surface of the transparent substrate layer 120.

Furthermore, a protective layer can be added on the outermost side of the screen according to the disclosure to prevent scratch or chemical corrosion. The protective layer can be one or more polyimide (PI) film, polyester (PET) film, poly naphthalene ester (PEN) film, polyvinyl chloride (PVC) film, polycarbonate (PC) film or liquid crystal polymer (LCP) film, glass plate, PC board, cloth, etc., for example, the PEN film on the glass plate. Of course, other auxiliary function layers can be set according to the design requirements.

As described above, the screen according to the present disclosure enables the screen to have high brightness uniformity and a high contrast by utilizing the in-plane non-uniform light absorption characteristics of the transmitting and projection-reflecting layer 13 and the angle selective reflection characteristic of the total reflection layer 12.

3. Specific examples of transmission light-absorbing layer

As mentioned above, in order to compensate for the non-uniform Fresnel reflection of the screen surface, it is necessary to set a transmitting and projection-reflecting layer 13 having non-uniform light absorption characteristics.

In one embodiment, in order to obtain a transmitting and projection-reflecting layer 13 having nonuniform light absorption characteristics in the screen plane, a simple implementation is to make the light-absorbing medium layer having light absorbing material particles with uniform density have different thicknesses in a direction perpendicular to the screen plane (i.e., in a thickness direction of the screen).

When light passes through the light absorbing material, a part of the light will be absorbed, and the transmittance satisfies the following relationship:

$$T = e^{-\alpha L} \quad (2)$$

Wherein T is the transmittance of the light absorbing material; $\alpha$ is the absorption coefficient of the light absorbing material; and L is the optical path length of the light in the light absorbing material.

The Fresnel loss of different regions on the screen surface can be theoretically calculated or fitted by actual test. According to the calculated or fitted Fresnel loss of different regions of the screen surface, combined with the reflectivity of the screen itself, a thickness of the light absorbing material needed to compensate the Fresnel loss of a certain region of the screen can be calculated. Assuming that the thickness of the absorbing material at $P_1(0,0)$ is $L_0$ and the thickness of the absorbing material at $P(x,y)$ is $L(x,y)$, an ideal perfectly uniform thickness distribution of the absorbing material can be deduced from the following formula:

$$L(x, y) \approx \frac{1}{2\alpha} \ln \frac{1 - f(0, 0)}{2 - f(x, y)} + L_0 \quad (3)$$

Figure 5:
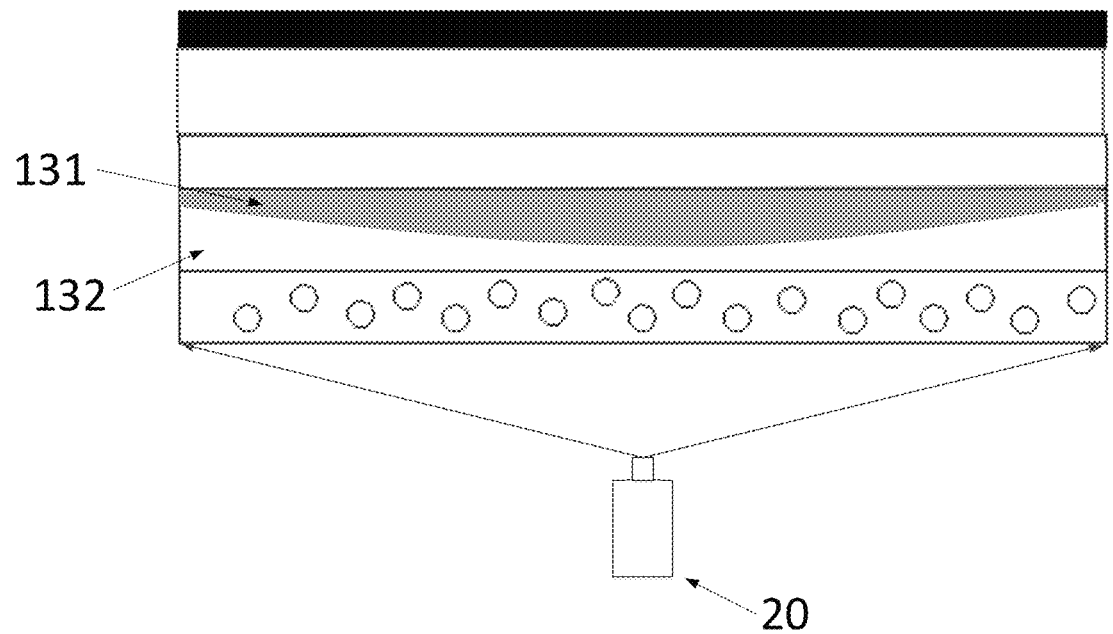
FIG. 5 and FIG. 6 are a top view and a side view showing a schematic structure of the screen according to an embodiment of the present disclosure, respectively.
Figure 6:
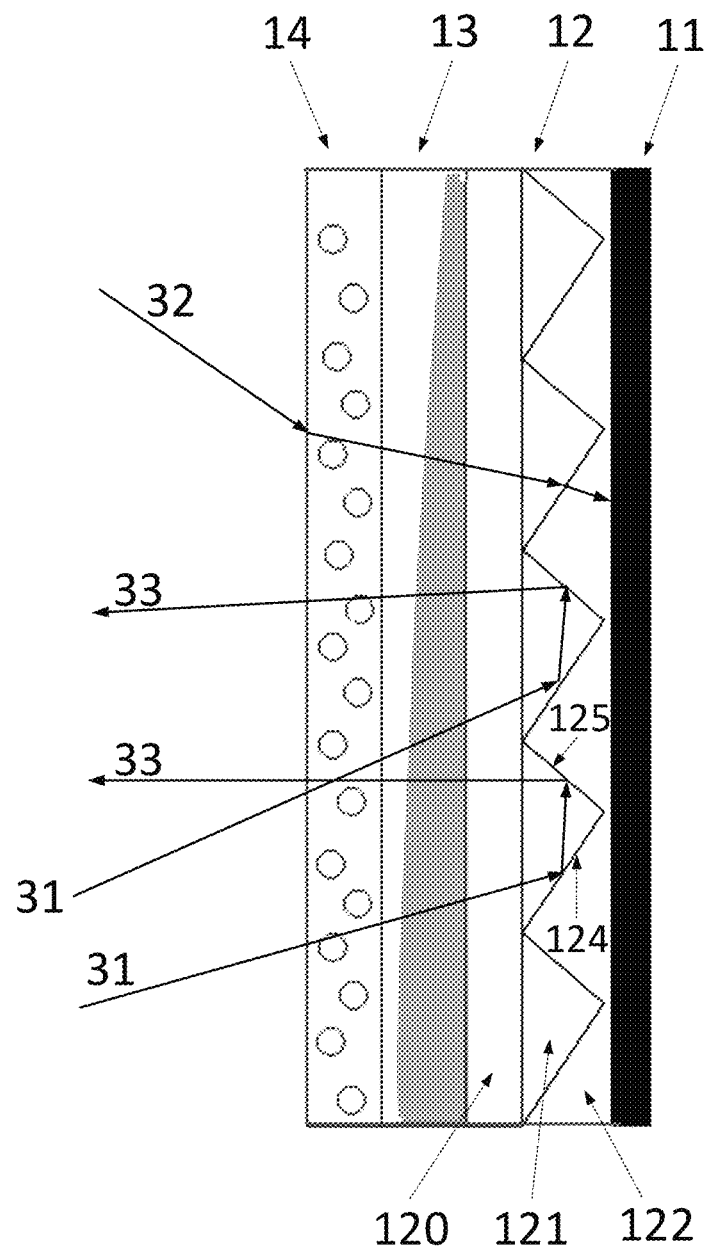

FIG. 5 and FIG. 6 are a top view and a side view showing a schematic structure of a screen according to an embodiment of the present disclosure, respectively. The transmitting and projection-reflecting layer 13 in FIG. 5 and FIG. 6 includes a light-absorbing medium layer 131 and a transparent medium layer 132. According to formula (1), in a horizontal direction of the screen, the closer to the center of the screen, the smaller the Fresnel loss is. According to formula (3), as shown in FIG. 5, the thickness of the light-absorbing medium layer 131 gradually decreases from the center of the screen to both edges in the horizontal direction. Thus, in the horizontal direction, the light absorption property of the light-absorbing medium layer 131 gradually decreases from the center to both edges. In addition, according to formula (1), in a vertical direction of the screen, the closer to the bottom of the screen, the smaller the Fresnel loss. According to formula (3), as shown in FIG. 6, the thickness of the light-absorbing medium layer 131 gradually decreases from the bottom of the screen to the top of the screen in the vertical direction. Thus, in the vertical direction, the light absorption property of the light-absorbing medium layer 131 gradually decreases from bottom to top. In one embodiment, the screen according to the embodiment of the present disclosure has both the horizontal and vertical thickness variation characteristics as shown in FIG. 5 and FIG. 6. That is, the thickness of the light-absorbing medium layer 131 of the screen gradually decreases from the center to both edges of the screen in the horizontal direction, while the thickness gradually decreases from the bottom of the screen to the top of the screen. However, it should be understood that the screen in some embodiments according to the present disclosure may selectively have a thickness variation characteristic in the horizontal or vertical direction as shown in FIG. 5 or FIG. 6. That is, the thickness of the light-absorbing medium layer 131 of the screen gradually decreases from the center to both edges of the screen in the horizontal direction, or the thickness of the light-absorbing medium layer 131 of the screen gradually decreases from the bottom of the screen to the top of the screen. In short, the thickness of different regions of the light-absorbing medium layer 131 can be selectively inversely proportional to the Fresnel reflectance (i.e., Fresnel reflection loss) of the projector light by the region of the screen surface, so as to compensate for the non-uniform Fresnel loss of the screen surface.

Figure 7:
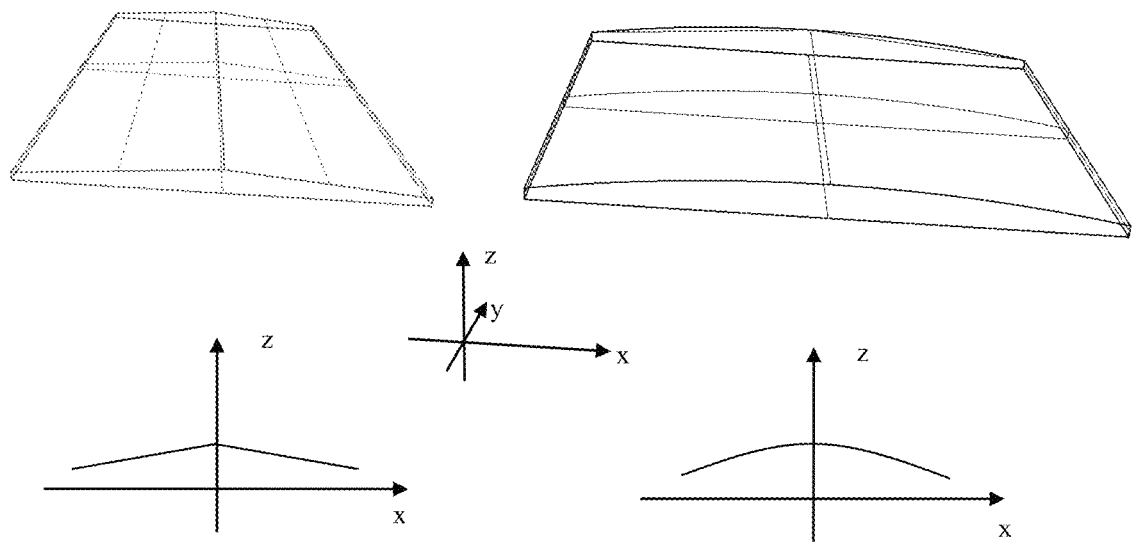
FIG. 7 and FIG. 8 are a schematic view and a side view showing a thickness distribution in a horizontal direction of the transmitting and projection-reflecting layer of the screen according to the embodiment of the present disclosure, respectively.
Figure 8:
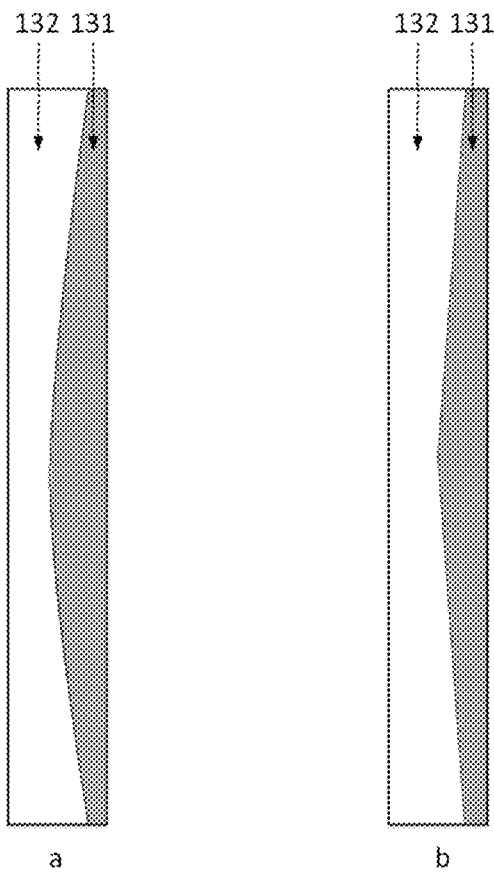

FIG. 7 and FIG. 8 show examples of the shape of the light-absorbing medium layer 131 having an uneven thickness distribution in the horizontal direction. As shown in the figure, variation of the thickness of the light-absorbing medium layer 131 can conform to a linear distribution or a curvilinear distribution. In addition, it should be understood that although the thickness variation of the light-absorbing medium layer 131 shown in FIG. 6 is in accordance with the curvilinear distribution in the vertical direction of the screen, it can also be the linear distribution.

There are many film processing methods to realize the different thickness distribution of light-absorbing medium layer 131, such as mold hot pressing, UV glue non-uniform coating, and UV curing. The selected materials can be transparent organic polymer materials such as PC and PET, and light-absorbing dyes (carbon black, carbon nanoparticles, etc.) are added to form a uniform distribution of light absorption medium. The absorption coefficient α of the film depends on a proportion of light-absorbing dyes per unit volume. Therefore, in order to achieve the same Fresnel loss compensation performance, if the proportion of light-absorbing dyes is high, the maximum thickness difference required by the light-absorbing medium layer 131 is less; if the proportion of light-absorbing dyes is low, the maximum thickness difference required by the light-absorbing medium layer 131 is great. The maximum thickness difference here refers to the maximum difference between the thicknesses of different regions of the absorbing medium layer. In other words, the maximum thickness difference required by the light-absorbing medium layer 131 decreases with the increasing of the proportion of light-absorbing dyes. For the hot pressing method, the prepared absorption material having a uniform thickness can be heated to a softening temperature, and then stamped by a die having a height distribution to obtain a film having a given thickness distribution. On transparent substrate, light absorbing materials with different thickness distribution can also be quickly obtained by UV glue coating and imprinting method.

In order to make the transmitting and projection-reflecting layer 13 absorb light in different degrees without changing light direction according to the thickness distribution of the light-absorbing medium layer 131, it is also necessary to set a transparent medium layer 132 on the surface with thickness variation of the light-absorbing medium layer 131, so that the transmitting and projection-reflecting layer 13 has a uniform thickness as a whole. The transparent medium layer 132 and the light-absorbing medium layer 131 should have approximately a same refractive index to reduce refraction of the interlayer interface. In one embodiment, an absolute value of the refractive index difference between the transparent medium layer 132 and the light-absorbing medium layer 131 should not be greater than 0.2. For example, the UV curable UV glue process can be used, a layer of transparent glue on the non-vertical surface of the light-absorbing medium layer 131 is coated to form a transparent medium layer 132 matching the shape of the light-absorbing medium layer 131, and the total thickness of the transmitting and projection-reflecting layer 13 is fixed.

Figure 9:
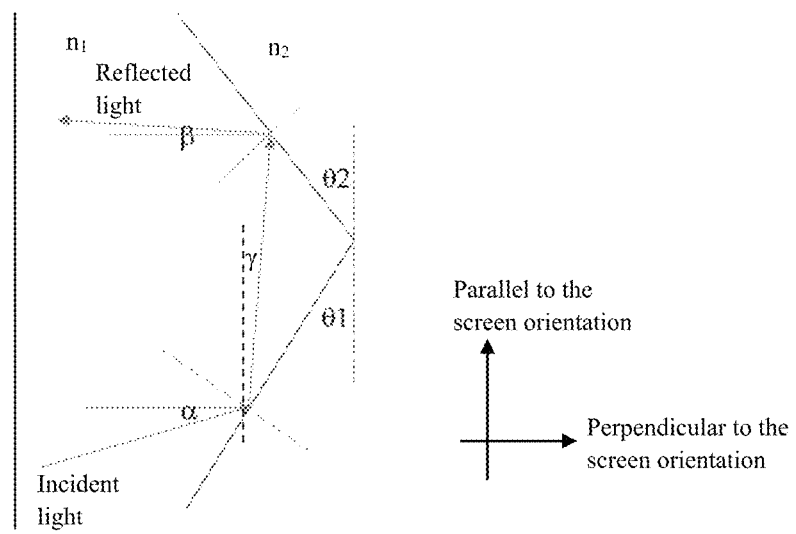
FIG. 9 is a schematic view showing an optical principle of a microstructure unit of a total reflection layer of the screen according to an embodiment of the present disclosure.

4. Optical principle and angle selection of total reflection microstructure unit FIG. 9 illustrates the optical principle of a total internal reflection microstructure unit of the screen according to an embodiment of the present disclosure. In order to facilitate the analysis, the light path optimization of the surface diffusion layer 14 to the projection light is not considered in the following discussion.

As shown in FIG. 9, the refractive index of the microstructure layer 121 is $n_1$ and the refractive index of the inner layer 122 is $n_2$. The angle between the first plane 124 of the microstructure unit and the screen plane (i.e., vertical direction) is $\theta_1$ (in degrees, the same below); and the angle between the second plane 125 of the microstructure unit and the screen plane (i.e., vertical direction) is $\theta_2$ (in degrees, the same below). The angle between the incident light and the horizontal direction is a; and the angle between the reflected light and the horizontal direction is $\beta$ (in degrees, the same below). When the reflected light emits horizontally, $\beta$ is obviously 0 degree, and it is set that when the reflected light is below the horizontal line (i.e., towards the ground), $\beta$ is negative, and when the reflected light is above the horizontal line (i.e., towards the ceiling), $\beta$ is positive. In order to make the incident light from the projector have twice total internal reflections on the two inclined planes and then emit towards the viewer's eye, according to the principle of geometrical optics and optical total reflection conditions, the following formulas (4)~(6) must be satisfied:

$$\theta_1 + \theta_2 = \frac{180 - (\alpha + \beta)}{2} \quad (4)$$

$$\cos(\theta_1 + \alpha) < \sqrt{1 - \left(\frac{n_2}{n_1}\right)^2} \quad (5)$$

$$\cos(\theta_2 + \beta) < \sqrt{1 - \left(\frac{n_2}{n_1}\right)^2} \quad (6)$$

The values of $\theta_1$ and $\theta_2$ cannot be determined completely based on the above formulas (4)~(6), and there are still some design freedom. Suppose that the angle between the intermediate light between the incident light and the emergent light and the screen plane (i.e., vertical direction) is $\gamma$, and it is set that when the intermediate light is inclined to the audience side, $\gamma$ is positive, and when the intermediate light is away from the audience side, $\gamma$ is negative. Then, according to the principle of geometrical optics and the condition of optical total reflection, it can calculate:

$$\theta_1 = \frac{90 - \alpha - \gamma}{2} \quad (7)$$

$$\theta_2 = \frac{90 - \beta + \gamma}{2} \quad (8)$$

According to formulas (7) and (8), as long as the optical paths of the incident light, the emergent light, and the intermediate light are determined (i.e., α, β and γ), the tilt angles $\theta_1$ and $\theta_2$ of the two intersecting planes of the microstructure can be determined completely.

In addition, according to formulas (7) and (8), even if the light paths of incident light and emergent light are determined, the values of $\theta_1$ and $\theta_2$ can be selected within a certain range by adjusting the optical path of intermediate light (i.e., adjusting the value of γ) according to different application requirements. For example, in the application of ultra short throw projection, the projector is located below the screen, so α>0 always keeps; and the audience's eyes are located above the projector, in order to ensure that the emergent light incident to the audience's eyes, $\alpha+\beta>0$ is always true. In this case, formula (4) can be used to obtain:

$$\theta_1+\theta_2<90 \qquad (9)$$

According to formula (9), in the application of ultra short throw projection, the angle between the first plane 124 and the second plane 125 of the microstructure unit of the screen according to the present disclosure must be an obtuse angle.

Figure 10:
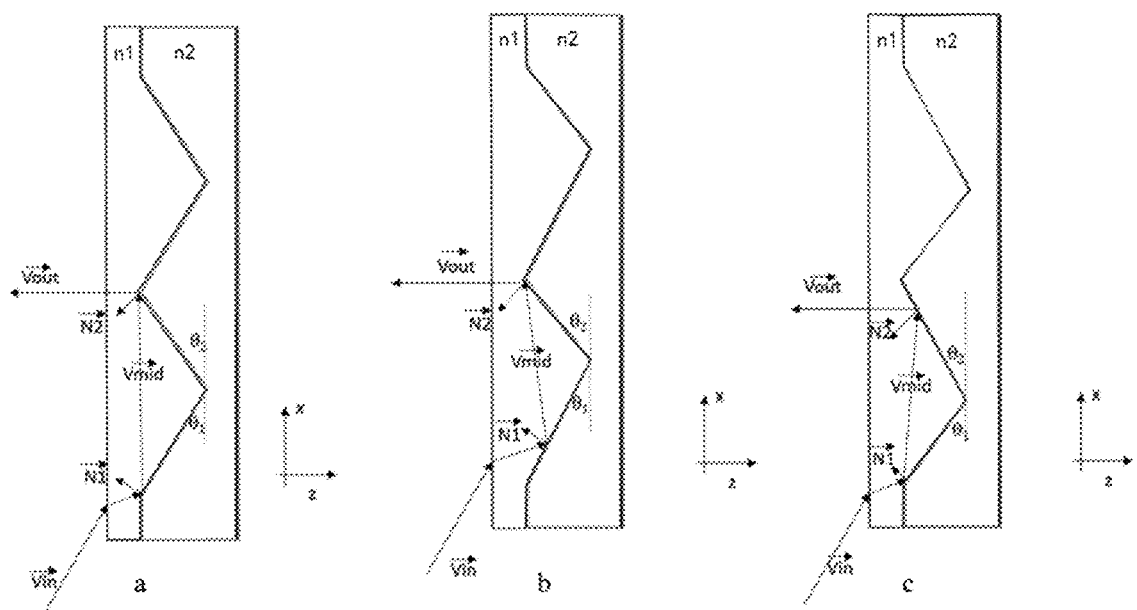
FIG. 10 is a schematic view showing a relationship between the tilt angle of the microstructure unit of the screen and the optical path according to the embodiment of the present disclosure.

An ideal light path case is shown in FIG. 10a, wherein an incident projection light $V_{in}$ totally reflected by one inclined plane of the microstructure unit to be an intermediate light $V_{mid}$, the intermediate light $V_{mid}$ travels in the direction parallel to the screen plane in the microstructure layer 121, and the $V_{mid}$ becomes the emergent light $V_{out}$ horizontally emitting towards the viewer direction after being totally reflected by another inclined plane of the microstructure unit.

In the case shown in FIG. 10a, at this time, $\gamma=0$ degree, $\beta=0$ degree. When $\theta_2=45$ degrees, the emergent light is emitted perpendicular to the screen, that is, $\beta=0$ degree. According to the above formula (9), we can know that $\theta_1<45$ degrees, that is, $\theta_1<\theta_2$.

However, in practical application, there may be non-ideal optical paths as shown in FIG. 10b and FIG. 10c. In FIG. 10b, the intermediate light $V_{mid}$ is generated by total internal reflection of the incident light $V_{mid}$ through the first inclined plane of the microstructure unit, but the moving direction of $V_{mid}$ is not parallel to the screen plane, but leans towards the viewer's side (at this time, $\gamma$ is positive). Therefore, some $V_{mid}$ may not be reflected by the second inclined plane and emit directly, which cannot make full use of the first inclined plane of the microstructure unit. In FIG. 10c, the intermediate light $V_{mid}$ is generated by total internal reflection of the incident light $V_{in}$ through the first inclined plane of the microstructure unit. However, the moving direction of the $V_{mid}$ is not parallel to the screen plane, but leans towards the side facing away from the viewer (at this time, $\gamma$ is negative). Therefore, it is impossible to make full use of the second inclined plane of the microstructure unit.

Figure 11:
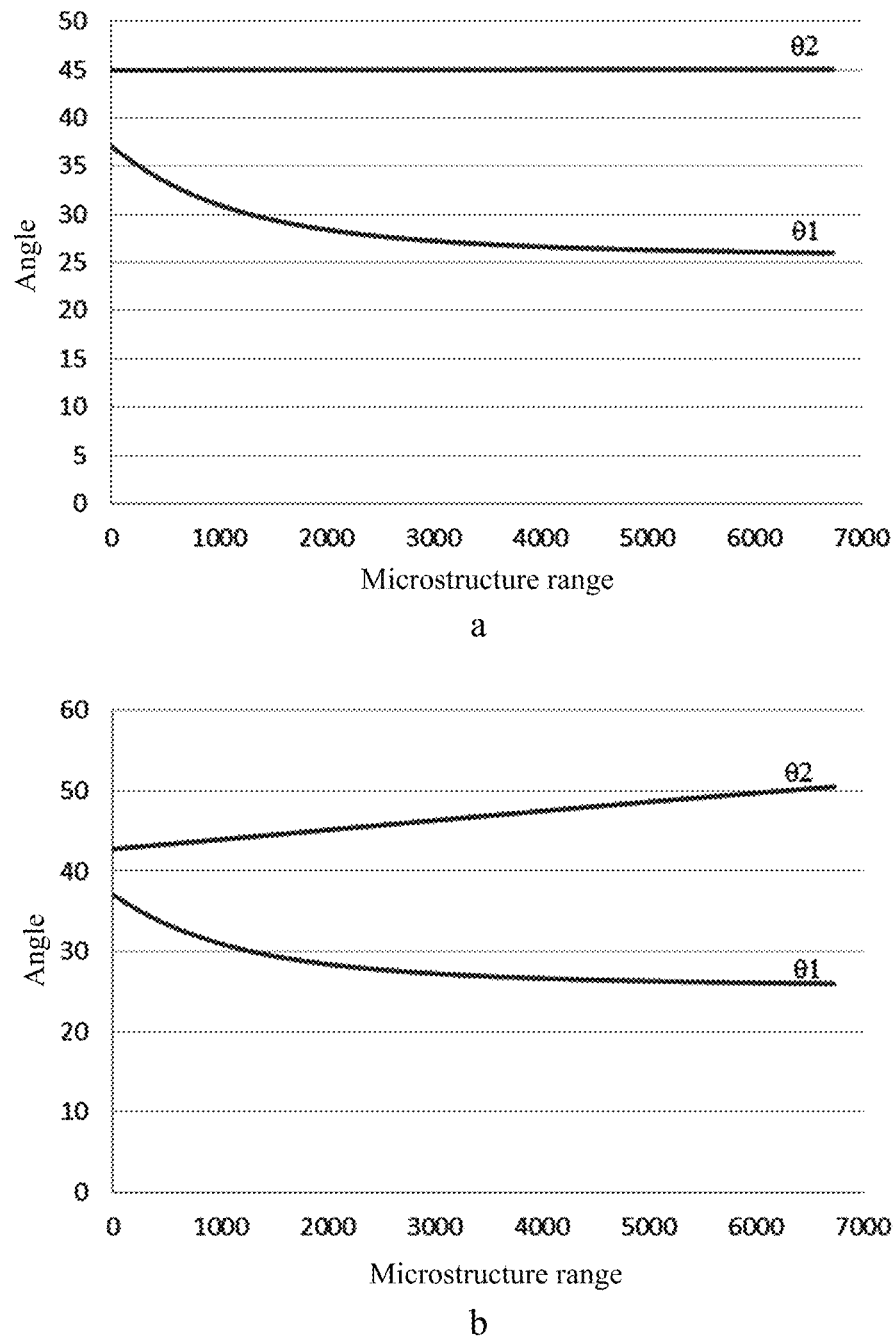
FIG. 11 is a simulation example showing optical angles of the microstructure unit of the screen according to an embodiment of the present disclosure.

In addition, as described above, the screen according to the present disclosure has the rotationally symmetric structure and includes the plurality of microstructure units. Therefore, the angle design of each microstructure unit can be the same or different. For example, FIG. 11 illustrates a simulated example of an optical angle of a microstructure unit of the screen according to the present disclosure. The focal point of the screen shown in FIG. 11 a is located at infinity, that is to say, in all the microstructure units of the screen, the emergent light are horizontally directed towards the direction of the viewer, so $\beta=0$ degree and $\theta_2=45$ degrees always keep. According to the simulation results, it can be seen that the $\theta_1$ of the microstructure unit decreases gradually as it is close to the top of the screen, and $\theta_1<\theta_2$, which satisfies the above formula (9). In the screen shown in FIG. 11b, the focus of the screen is no longer at infinity. In this case, along the direction from the center of the screen to the edge of the screen, the value of $\theta_1$ of the microstructure unit of the screen decreases, while the value of $\theta_2$ increases.

5. Refractive index selection of microstructure layer and inner layer

Figure 12:
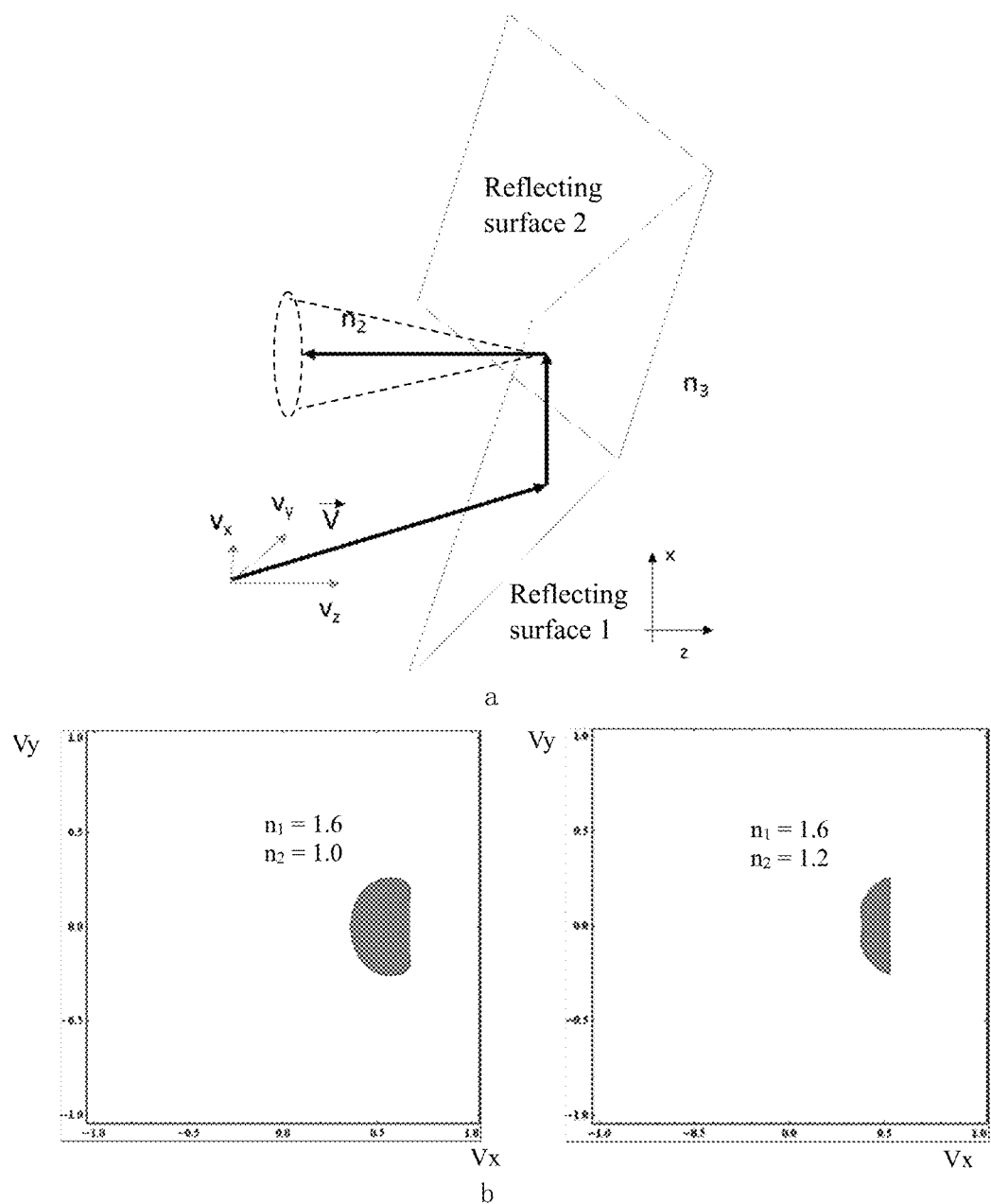
FIG. 12 is a schematic view showing a relationship between refractive indexes of materials of the total reflection layer and the inner layer of the screen according to the embodiment of the present disclosure.

In addition to the values of $\theta_1$ and $\theta_2$, it can be seen from the optical total internal reflection formula that the total internal reflection microstructure unit satisfying twice total internal reflection is also affected by the refractive index $n_1$ of the microstructure layer 121 and the refractive index $n_2$ of the inner layer 122. The microstructure layer 121 of the screen according to the present disclosure is usually made of transparent resin material, and its refractive index is in a range of 1.3-1.7. Alternatively, the microstructure layer 121 may also be made of other materials having a similar refractive index. In addition, scattering ions or absorbing materials can also be doped into the material for fabricating the microstructure layer 121. Therefore, in order to satisfy the total internal reflection condition, it is necessary to consider the selection of the refractive index $n_2$ of the inner layer 122. The influence of the refractive index of the incident light element 12 on the total internal reflection area of the incident light of the microstructure unit is shown in FIG. 12. As shown in a in the upper side of FIG. 12, the incident light V can be expressed as $(V_x, V_y, V_z)$, wherein the Z axis is perpendicular to the screen and the X axis and the Y axis are parallel to the screen. Obviously, the total internal reflection area of incident light depends on the value range of $V_x$ and $V_y$. $V_z$ satisfies:

$$V_z=\sqrt{1-V_x^2-V_y^2} \qquad (10)$$

Assuming that the emergent light is facing the eyes of the viewer and the refractive index $n_1$ of the microstructure layer 121 is 1.6, according to the above formulas (5) and (6), the variation trend of the value range of the components $(V_x, V_y)$ of the incident light satisfying the total internal reflection condition with the refractive index $n_2$ of the inner layer 122 can be obtained. As shown in b in the lower side of FIG. 12, the area satisfying total internal reflection of incident light on both inclined planes of the microstructure unit decreases with the increasing of $n_2$. In other words, with the increasing of $n_2$, a probability that the light emitted from the projector cannot be totally reflected twice on the two inclined planes of the microstructure unit increases. Therefore, in order to ensure a certain screen reflection efficiency, it is necessary to make $n_1$ and $n_2$ satisfy:

$$n_2<n_1-0.2 \qquad (11)$$

When the above conditions are met, the inner layer 122 is an air layer.

Figure 13:
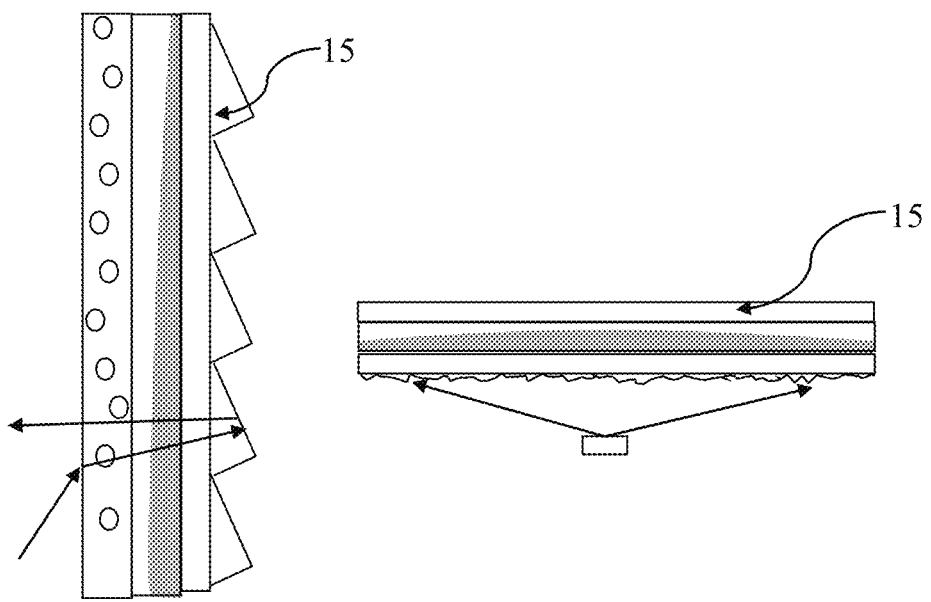
FIG. 13 shows a schematic structure of a screen according to another embodiment of the present disclosure.

It should be understood that the above-mentioned exemplary embodiments are not restrictive but are only examples of all aspects. Those skilled in the art can obviously make various reasonable modifications and substitutions to the above embodiments without departing from the spirit and main purpose of the disclosure. For example, in the above embodiment, in order to obtain a projection image having a high contrast, the projection-reflecting layer is composed of a total internal reflection layer and an absorption layer. However, a common reflection layer known in the art, such as a Fresnel reflection layer, can also be used as a projection-reflecting layer. FIG. 13 shows a schematic view of the screen structure in this case. It can be seen from FIG. 13 that the structure, function and characteristics of the surface diffusion layer and transmitting and projection-reflecting layer of the screen in this example are the same as those described in the above embodiments, except that the Fresnel reflection layer 15 is used as the projection-reflecting layer.

Although the screen and projection system according to the present disclosure has been described above with reference to the accompanying drawings, the present disclosure is not limited to this, and it should be understood by those skilled in the art that various changes, combinations, sub combinations and variants can be made without departing from the substance or scope defined in the accompanying claims of the disclosure.

What is claimed is:

1. A screen capable of reflecting projection light from a projector to viewing field of a viewer, comprising at least a surface diffusion layer, a transmitting and light-absorbing layer, and a projection-reflecting layer stacked sequentially from an incident side of the projection light,
  wherein the projection-reflecting layer is configured to selectively reflect the projection light; and
  wherein the transmitting and projection-reflecting layer comprises light absorbing material particles, and distribution of the light absorbing material particles in the transmission light absorbing layer is set according to distribution of a Fresnel loss of the projection light on a surface of the screen, so that the greater a Fresnel loss in a region of the screen, the higher a transmittance of a portion of the transmitting and light-absorbing layer in the region.

2. The screen of claim 1, wherein the transmitting and projection-reflecting layer comprises a light-absorbing medium layer and a transparent medium layer, wherein the light-absorbing medium layer comprises light absorbing material particles distributed with a uniform density;
  a thickness of the light-absorbing medium layer in a region is inversely proportional to a Fresnel reflectance of the screen surface in the region for the projection light;
  a total thickness of the light-absorbing medium layer and the transparent medium layer is a fixed value; and
  an absolute value of a difference between refractive indexes of the light-absorbing medium layer and the transparent medium layer is not greater than 0.2.

3. The screen of claim 2, wherein in a horizontal direction, the thickness of the light-absorbing medium layer gradually decreases from a center to both edges of the screen, and/or in a vertical direction, the thickness of the light-absorbing medium layer gradually decreases from a bottom to a top of the screen.

4. The screen of claim 2, wherein a variation of the thickness of the light-absorbing medium layer in a horizontal direction conforms to a linear distribution or a curvilinear distribution, or a variation of the thickness of the light-absorbing medium layer in a vertical direction conforms to a linear distribution or a curvilinear distribution.

5. The screen of claim 2, wherein the light-absorbing medium layer comprises a light-absorbing dye, and a maximum thickness difference between different regions of the light-absorbing medium layer decreases with increasing of a proportion of the light absorbing dye.

6. The screen of claim 2, wherein the transparent medium layer is a transparent glue layer.

7. The screen of claim 1, the projection-reflecting layer comprises a total reflection layer and a light-absorbing layer stacked sequentially from the incident side of the projection light, wherein the light absorbing layer is capable of absorbing light;
  the total reflection layer comprises a microstructure layer, and the microstructure layer comprises a plurality of microstructure units; and
  the microstructure unit comprises a first plane at a lower side and a second plane at an upper side, wherein the first plane intersects the second plane, the plurality of microstructure units form a serrated structure, and total internal reflection of the projection light continuously happens on the first plane and the second plane.

8. The screen of claim 7, wherein the microstructure layer comprises a rotationally symmetric structure, and a rotation center axis is perpendicular to a plane of the screen and is located below the screen.

9. The screen of claim 1, wherein the projection-reflecting layer is a Fresnel reflection layer.

10. A projection system, comprising a projector and a screen;
  the screen capable of reflecting projection light from a projector to viewing field of a viewer, comprising at least a surface diffusion layer, a transmitting and light-absorbing layer, and a projection-reflecting layer stacked sequentially from an incident side of the projection light,
  wherein the projection-reflecting layer is configured to selectively reflect the projection light; and
  wherein the transmitting and projection-reflecting layer comprises light absorbing material particles, and distribution of the light absorbing material particles in the transmission light absorbing layer is set according to distribution of a Fresnel loss of the projection light on a surface of the screen, so that the greater a Fresnel loss in a region of the screen, the higher a transmittance of a portion of the transmitting and light-absorbing layer in the region.

11. The projection system of claim 10, wherein the transmitting and projection-reflecting layer comprises a light-absorbing medium layer and a transparent medium layer, wherein
  the light-absorbing medium layer comprises light absorbing material particles distributed with a uniform density;
  a thickness of the light-absorbing medium layer in a region is inversely proportional to a Fresnel reflectance of the screen surface in the region for the projection light;
  a total thickness of the light-absorbing medium layer and the transparent medium layer is a fixed value; and
  an absolute value of a difference between refractive indexes of the light-absorbing medium layer and the transparent medium layer is not greater than 0.2.

12. The projection system of claim 11, wherein in a horizontal direction, the thickness of the light-absorbing medium layer gradually decreases from a center to both edges of the screen, and/or in a vertical direction, the thickness of the light-absorbing medium layer gradually decreases from a bottom to a top of the screen.

13. The projection system of claim 11, wherein a variation of the thickness of the light-absorbing medium layer in a horizontal direction conforms to a linear distribution or a curvilinear distribution, or a variation of the thickness of the light-absorbing medium layer in a vertical direction conforms to a linear distribution or a curvilinear distribution.

14. The projection system of claim 11, wherein the light-absorbing medium layer comprises a light-absorbing dye, and a maximum thickness difference between different regions of the light-absorbing medium layer decreases with increasing of a proportion of the light-absorbing dye.

15. The projection system of claim 11, wherein the transparent medium layer is a transparent glue layer.

16. The projection system of claim 10, wherein the projection-reflecting layer comprises a total reflection layer and a light-absorbing layer stacked sequentially from the incident side of the projection light, wherein
  the light absorbing layer is capable of absorbing light;
  the total reflection layer comprises a microstructure layer, and the microstructure layer comprises a plurality of microstructure units; and
  the microstructure unit comprises a first plane at a lower side and a second plane at an upper side, wherein the first plane intersects the second plane, the plurality of microstructure units form a serrated structure, and total internal reflection of the projection light continuously happens on the first plane and the second plane.

17. The projection system of claim 16, wherein the microstructure layer comprises a rotationally symmetric structure, and a rotation center axis is perpendicular to a plane of the screen and is located below the screen.

18. The projection system of claim 10, wherein the projection-reflecting layer is a Fresnel reflection layer.

* * * * *